Patented Apr. 27, 1943

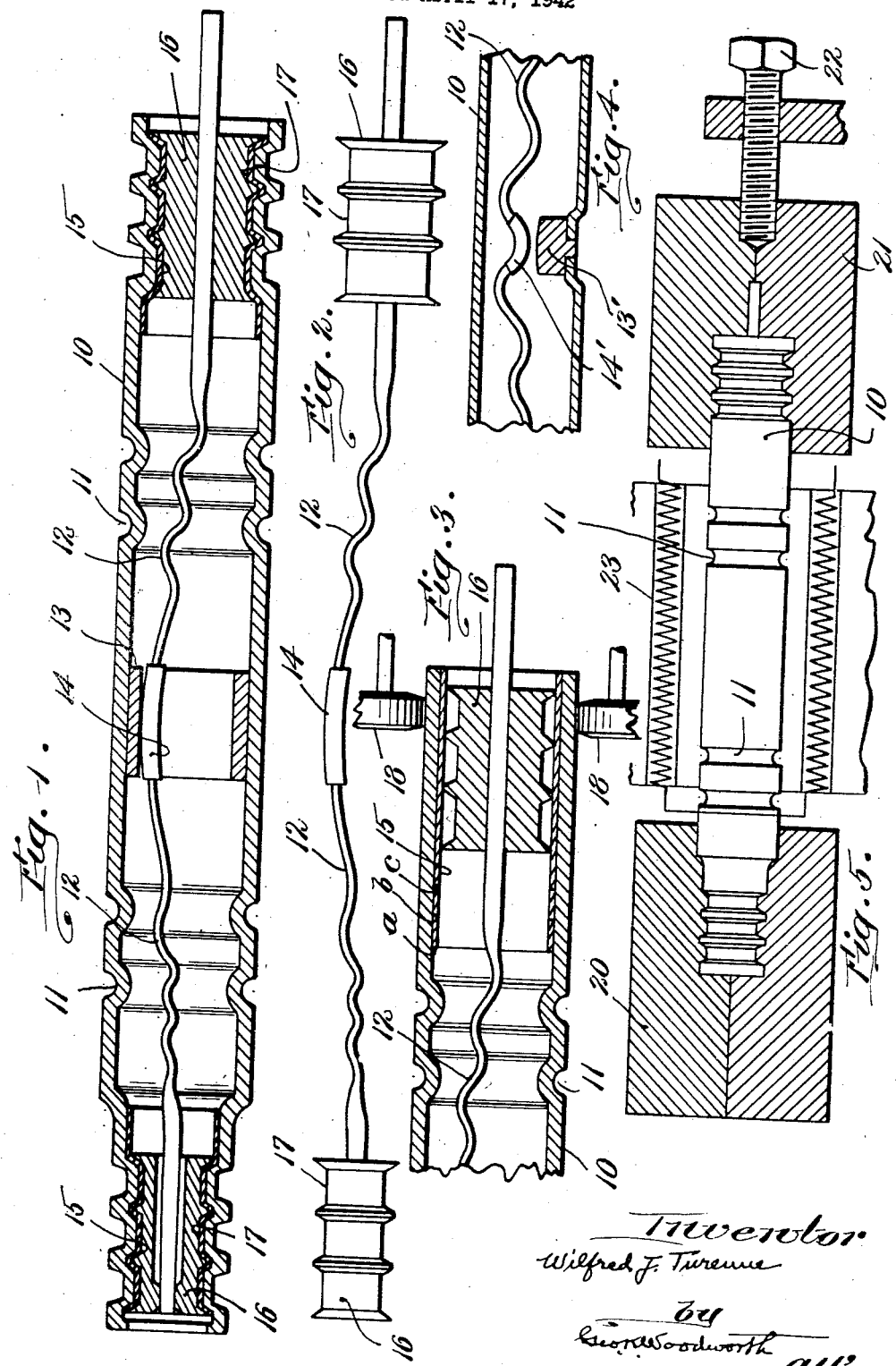

2,317,828

UNITED STATES PATENT OFFICE 2,317,828

THERMOSTATIC SWITCH

Wilfred J. Turenne, Fayville, Mass.

Application April 17, 1942, Serial No. 439,324

11 Claims. (Cl. 200—137)

This invention relates to circuit controlling thermostatic switches whereby apparatus in circuit with the switch may be controlled to regulate the temperature of any device.

The principal object of the invention is to provide a minute thermostatic switch which is preset at the factory to respond to a specified temperature and which may not thereafter be adjusted by the user. It comprises, generally speaking, a stretchable casing, preferably tubular, enclosing a stretchable spring, plate, or strut, the ends of which are rigidly secured to the ends of the casing. By means of a suitable appliance, the lengths of the casing and strut may be varied mechanically at the factory so that the circuit connected with the casing and strut may be opened or closed when the device with which the thermostat is associated acquires a given temperature, the opening or closing of the circuit, as the case may be, controlling suitable auxiliary apparatus whereby a desired result will be effected, e. g., the temperature of such device may be reduced. The midget thermostat may be applied, by way of example, to the control of the temperature of the engines of an aeroplane, for example, a dive bomber, and such control effected by suitable arrangements whereby louvres or other type of ventilators in the cock pit of the aeroplane may be opened by electrical apparatus the circuit of which is controlled by the thermostat.

In the accompanying drawing,

Figure 1 is a longitudinal section of a very small thermostatic switch embodying my invention, whereby a circuit will be opened at a predetermined temperature, the switch being shown about four times its actual size.

Fig. 2 is a plan view of the leaf spring or strut and the cylindrical heads to which its ends are secured.

Fig. 3 is a fragmentary sectional view representing one way in which the ends of the strut are rigidly secured to the respective ends of the casing.

Fig. 4 is a fragmentary longitudinal section of a thermostatic switch embodying my invention, whereby a circuit will be closed at a predetermined temperature.

Fig. 5 is a conventional representation of means that may be employed for presetting the thermostat.

In the particular drawing selected for more fully disclosing the invention, and which, it will be understood, are illustrative, merely, 10 is a casing, herein shown as tubular in form, made of a material having a relatively high coefficient of expansion, brass, for example. To facilitate the mechanical elongation thereof, the casing is grooved circumferentially intermediate the ends thereof, as shown at 11, 11, two sets of such grooves being shown in the present instance, each intermediate the central portion of the casing and one of the ends thereof.

Enclosed within the casing and rigidly secured in any suitable manner to the ends thereof is a metallic spring or strut of invar, or other suitable metal, the coefficient of expansion of which is very small, in fact, practically zero. To facilitate the elongation of the strut, corrugations 12 are formed intermediate the ends thereof, and in the present instance two such sets of corrugations are shown between the central and respective end portions thereof. The corrugated portions of the strut may, as indicated, be placed at or near the grooved portions of the casing.

To facilitate electrical contact between the strut and casing, the latter is provided with a metallic member projecting from its inner wall and the strut with a co-operating protuberance. In the illustrative example shown in Figure 1, the metallic member is a short length of metal tubing 13 secured to the inner wall of the casing, and the co-operating protuberance on the strut is a sleeve 14, said tubing and sleeve being formed of suitable electrical contact material.

The circuit controlling members, that is, the strut and casing, are insulated from each other by mica 15, or other suitable insulating material.

The preferred way of securing the strut within the casing is illustrated in Figs. 2 and 3. The ends of the strut, which as shown may be cylindrical, the intermediate portion thereof being flattened to form a leaf spring, are rigidly affixed to solid cylindrical heads 16, which are provided with several grooves 17, herein shown as three in number. Each head is then wrapped with sheet insulating material, such as mica, and the assemblage is inserted within the casing. By means of a suitable spinning tool, indicated at 18, the outer periphery of the casing is grooved circumferentially, such grooves registering with those of the cylindrical heads 16, respectively. In this way, annular portions of the casing and insulation are driven into the grooves of the heads. As indicated in Fig. 3, the inner end of the insulating tube extends inwardly of the inner end of the heads, the inner end of such tube being indicated at a. After the spinning tool has formed the outermost groove in the casing and forced a certain portion of the insulation, as well as the metal of the casing, into the outermost groove of the head, the innermost end of the insulation tube will be drawn slightly to the right and will occupy the position indicated by b. Another groove is then formed in the outer surface of the casing in register with the middle groove in the head with the same result as above set out, and then the inner end of the insulation tube will occupy the position indicated at c, and so on. Thus by successively forcing annular portions of the casing and annular portions of the insulation into the several grooves of the head, the insulation tube will be intact, although, as will be obvious, if the several grooves were formed simultaneously the mica would be stretched and broken at points intermediate the grooves, thereby causing the two thermostat elements to be in mechanical and electrical contact.

By the reverse acting switch shown in Fig. 4, a circuit which includes the circuit controlling members, that is, the casing 10 and strut 12, provided, respectively, with the contact elements 13', 14', for example, the circuit of a fire alarm system, may be closed at a predetermined temperature. In this figure a block 13' of silver or other suitable metal is set into the wall of the casing and the co-operating contact 14' on the strut is suitably spaced therefrom and preferably is convexed thereto.

In order to preset the thermostatic switch at the factory for closing an electric circuit at a given temperature, beyond which the temperature of the device with which the switch is associated ought not to rise, one may proceed as follows: The ends of the switch with the contacts open are firmly clamped in suitable holders conforming to the shape of said ends, one holder being stationary and the other arranged for movement away from the first by any suitable means. The temperature to which the thermostat is subjected is controlled by various well known means suitable for this purpose. If the thermostat is to be used to close a circuit at a given temperature, the temperature surrounding the thermostat is adjusted to that value and the thermostat stretched until the contact making elements thereof are brought together. When the thermostat is removed from the stretching mechanism and the temperature controlling means, the co-operating contacts will separate, and thereafter will close when the device that is to be protected from a temperature higher than that for which the switch is set is subjected to such temperature.

If the thermostatic switch is to be preset to open a circuit at a predetermined temperature, the same procedure is followed except that the contacts are closed when the switch is placed in the holder and the stretching operation is continued until the contacts open. In such case, when the thermostat is removed from the stretching mechanism and the temperature controlling means, the co-operating contacts will come together and thereafter will open when the device that is to be protected from a temperature higher than that for which the switch is set is subjected to such temperature.

In the conventional layout shown in Fig. 4, 20 is a stationary clamping member applied to the left end of the thermostat; 21 is a movable clamping member applied to the right end thereof, and 22 is a screw whereby the latter is moved outwardly or away from the stationary clamp to elongate the casing and strut. To regulate the temperature to which the thermostat is subjected during the stretching operation, an electrical heating element 23 placed around the portions of the thermostat that are not engaged by the clamps, may be used.

If in the use of the thermostat the device associated therewith and protected thereby should be subjected to a temperature considerably higher than that for which said thermostat was preset, the excessive stretching resulting from such "overshooting" would not destroy the switch by putting undue strain on the heads 10, the corrugations of the strut permitting a substantial amount of stretching and thus preventing such strain. If it were desired to restore the thermostat to its original setting after it had been subjected to a temperature much higher than that for which it had been set, the thermostat could again be placed in the apparatus represented in Fig. 5, and by the reverse movement of the screw 22, compressed, until the contact members 13 and 14 were separated, whereupon they could be brought into the desired degree of electrical contact by the stretching operation above explained; or, the contact members 13', 14', brought together, whereupon the latter could be suitably separated by said stretching operation.

Having thus described illustrative embodiments of my invention without, however, limiting the same thereto, what I claim and desire to secure by Letters Patent is:

1. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to break contact therewith at said temperature and being corrugated intermediate its ends.

2. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to break contact therewith at said temperature and said casing being grooved circumferentially intermediate the ends thereof.

3. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to break contact therewith at said temperature and being corrugated intermediate its ends, and said casing being grooved circumferentially intermediate the ends thereof.

4. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to break contact therewith at said temperature and corrugated intermediate said central portion and the respective ends thereof.

5. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to make contact therewith at said temperature, and said casing being grooved circumferentially intermediate its central portion and the respective ends thereof.

6. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being bowed at its central portion to make contact with said casing below a given temperature and to break contact therewith at said temperature and corrugated intermediate said central portion and the respective ends thereof, and said casing being grooved circumferentially intermediate its central portion and the respective ends thereof.

7. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, a metallic member projecting from the inner wall of said casing near the central portion thereof, and said strut having a co-operating protuberance disposed to make electrical contact with said member, said strut being bowed at its central portion to bring said protuberance into electrical contact with said member below a given temperature and to bring said protuberance out of contact therewith at said temperature, and being corrugated intermediate its ends, said casing being grooved circumferentially intermediate the ends thereof.

8. A pre-set thermostatic switch comprising in combination a stretchable metallic casing and a resilient strut enclosed therein, said casing and strut having different coefficients of expansion, means rigidly securing the ends of said strut to the respective ends of said casing, means insulating the ends of said strut from the respective ends of said casing, said strut being corrugated intermediate its ends, and co-operating contact members on said casing and strut, respectively.

9. A pre-set thermostatic switch comprising in combination a stretchable metallic casing and a resilient strut enclosed therein, said casing and strut having different coefficients of expansion, means rigidly securing the ends of said strut to the respective ends of said casing, means insulating said strut from said casing, said strut being bowed at its central portion to break contact with said casing below a given temperature and to make contact therewith at said temperature and being corrugated intermediate its ends.

10. A pre-set thermostatic switch comprising in combination a stretchable metallic casing and a resilient strut enclosed therein, said casing and strut having different coefficients of expansion, means rigidly securing the ends of said strut to the respective ends of said casing, means insulating said strut from said casing, a metallic member projecting from the inner wall of said casing near the central portion thereof, and a co-operating protuberance disposed on said strut to make electrical contact with said member, said strut being bowed at its central portion to bring said protuberance out of electrical contact with said member below a given temperature and to bring said protuberance into contact therewith at said temperature, and being corrugated intermediate its ends and said casing being grooved circumferentially intermediate the ends thereof.

11. In a pre-set thermostatic switch, a thermally responsive circuit controlling member, a strut enclosed within said member, heads rigidly secured to the respective ends of said strut and means rigidly securing said heads to said member, said strut being corrugated intermediate its ends to prevent undue strain on said heads when the switch is overheated.

WILFRED J. TURENNE.